United States Patent
Herre et al.

(10) Patent No.: US 7,460,994 B2
(45) Date of Patent: Dec. 2, 2008

(54) METHOD AND APPARATUS FOR PRODUCING A FINGERPRINT, AND METHOD AND APPARATUS FOR IDENTIFYING AN AUDIO SIGNAL

(75) Inventors: Jürgen Herre, Buckenhof (DE); Eric Allamanche, Nürnberg (DE); Oliver Hellmuth, Erlangen (DE); Thorsten Kastner, Stockheim/Reitsch (DE); Markus Cremer, Ilmenau (DE)

(73) Assignee: M2ANY GmbH, Garching (DE)

( * ) Notice: Subject to any disclaimer, the term of this patent is extended or adjusted under 35 U.S.C. 154(b) by 921 days.

(21) Appl. No.: 10/483,452

(22) PCT Filed: Jun. 20, 2002

(86) PCT No.: PCT/EP02/06849

§ 371 (c)(1),
(2), (4) Date: Jan. 8, 2004

(87) PCT Pub. No.: WO03/007185

PCT Pub. Date: Jan. 23, 2003

(65) Prior Publication Data

US 2004/0172411 A1     Sep. 2, 2004

(30) Foreign Application Priority Data

Jul. 10, 2001     (DE) ................................. 101 33 333

(51) Int. Cl.
*G10L 15/00*     (2006.01)
(52) U.S. Cl. ........................................ 704/231; 704/205
(58) Field of Classification Search ................ 704/231, 704/205
See application file for complete search history.

(56) References Cited

U.S. PATENT DOCUMENTS 5,210,820 A * 5/1993 Kenyon ...................... 704/200

(Continued)

FOREIGN PATENT DOCUMENTS

JP     2003005780     1/2003

OTHER PUBLICATIONS

Herre et al., "Robust Matching of Audio Signals Using Spectral Flatness Features," IEEE, Applications of Signal Processing to Audio and Acoustics, 2001, pp. 127-130.*

*Primary Examiner*—Susan McFadden
(74) *Attorney, Agent, or Firm*—Michael A. Glenn; Glenn Patent Group (57) ABSTRACT

For producing a fingerprint of an audio signal, use is made of information defining a plurality of predetermined fingerprint modi, all of the fingerprint modi relating to the same type of fingerprint, the fingerprint modi, however, providing different fingerprints differing from each other with regard to their data volume, on the one hand, and to their characterizing strength for characterizing the audio signal, on the other hand, the fingerprint modi being pre-determined such that a fingerprint in accordance with a fingerprint modus having a first characterizing strength is convertible to a fingerprint in accordance with a fingerprint modus having a second characterizing strength, without using the audio signal. A predetermined fingerprint modus of the plurality of predetermined fingerprint modi is set and subsequently used for computing a fingerprint using the audio signal. The convertibility feature of the fingerprints having been produced by the different fingerprint modi enables setting a flexible compromise between the data volume and the characterizing strength for certain applications without having to re-generate a fingerprint database with each change of the fingerprint modus. Fingerprint representations scaled with regard to time or frequency may readily be converted to a different fingerprint modus.

18 Claims, 5 Drawing Sheets

U.S. PATENT DOCUMENTS

| | | | |
|---|---|---|---|
| 5,918,223 A * | 6/1999 | Blum et al. ..................... 707/1 |
| 6,275,800 B1 | 8/2001 | Chevalier et al. |
| 6,437,227 B1 | 8/2002 | Theimer |
| 6,453,252 B1 * | 9/2002 | Laroche ....................... 702/75 |
| 6,963,975 B1 * | 11/2005 | Weare ......................... 713/176 |
| 7,277,766 B1 * | 10/2007 | Khan et al. .................... 700/94 |
| 7,287,275 B2 * | 10/2007 | Moskowitz .................... 726/13 |
| 7,289,643 B2 * | 10/2007 | Brunk et al. ................. 382/100 |
| 2002/0133499 A1 * | 9/2002 | Ward et al. ................... 707/102 |

\* cited by examiner

FP MODUS NO. 4

FP MODUS NO. 3

FP MODUS NO. 2

FP MODUS NO. 1

METHOD AND APPARATUS FOR PRODUCING A FINGERPRINT, AND METHOD AND APPARATUS FOR IDENTIFYING AN AUDIO SIGNAL

RELATED APPLICATIONS

The present invention claims priority under 35 U.S.C. 120 to PCT/EP02/06849, filed on Jun. 20, 2002 by the same inventors and to German Application No. 10133333.1, filed on Jul. 10, 2001 by the same inventors, both of which are incorporated herein in their entirety.

BACKGROUND OF THE INVENTION

1. Field of the Invention

The present invention relates to characterizing, or identifying, audio signals with regard to their content, in particular to producing and using different fingerprints for an audio signal.

2. Description of Prior Art

Recent years have seen a high increase in the availability of multimedia data material, i.e. audio data. This development is due to a number of technical factors. These technical factors include, for example, the wide availability of the internet, the wide availability of high-performance computers as well as the wide availability of high-performance methods of data compression, i.e. source coding, of audio data. As an example of this, mention shall be made of MPEG 1/2 layer 3, also referred to as MP3.

The huge amounts of audiovisual data available, for example, on the internet, on a worldwide scale, call for concepts enabling these data to be evaluated, categorized or managed by content-related criteria. There is a need to search and find multimedia data specifically by stating useful criteria.

This requires the use of so-called "content-based" techniques extracting, from the audiovisual data, so-called "features" representing important characteristic content properties of the signal of interest. On the basis of such features or combinations of such features, similarity relationships, or common features, between the audio signals may be derived. This process is generally done by comparing, or relating, the extracted feature values from different signals, which shall be referred to as "pieces" herein.

The U.S. Pat. No. 5,918,223 discloses a method for contents-based analysis, storage, retrieval and segmentation of audio information. Analysis of audio data produces a set of numerical values which is also referred to as feature vector and may be used to classify and rank the similarity between the individual audio pieces which are typically stored in a multimedia database or on the worldwide web.

In addition, the analysis enables the description of user-defined classes of audio pieces based on an analysis of a set of audio pieces, which are all members of a user-defined class. The system is able to find individual sound sections within a relatively long sound piece, which enables the audio record to be automatically segmented into a series of shorter audio segments.

The features used for characterizing or classifying audio pieces with regard to their content include the loudness of a piece, the pitch, brightness, bandwidth and so-called Mel-frequency Cepstral coefficients (MFCCs) at periodic intervals in the audio piece. The per-block or per-frame values are stored and subject to a first derivation. Hereupon, specific statistical quantities, for example the mean value or standard deviation, of each of these features, including the first derivatives of same, are computed to describe a variation over time. This set of statistical quantities forms the feature vector. The feature vector of the audio piece is stored in a database with association with the original file, a user being able to access the database so as to fetch appropriate audio pieces.

The database system is capable of quantifying the distance, in an n-dimensional space, between two n-dimensional vectors. It is further possible to produce classes of audio pieces by specifying a set of audio pieces belonging to a class. Examples of classes are bird sounds, rock music, etc. The user is enabled to search the audio-piece database using specific methods. The result of a search is a list of sound files which are listed ordered in accordance with their distance from the specified n-dimensional vector. The user may search the database with regard to similarity features, with regard to acoustic and/or psycho-acoustic features, with regard to subjective features or with regard to specific noises, for example the buzzing of bees.

The specialist publication "Multimedia Content Analysis", Yao Wang et al., IEEE Signal Processing Magazine, November 2000, pp. 12 to 36, discloses a similar concept for characterizing multimedia pieces. Features for classifying the contents of a multimedia piece are proposed to include time domain features or frequency domain features. These include the loudness, the pitch as the basic frequency of an audio signal shape, spectral features, such as the energy content of a tape in relation to the total energy content, cut-off frequencies in the spectral curve etc. In addition to short-term features, which relate to the quantities mentioned per block of samples of the audio signal, long-term quantities relating to a longer period of the audio piece are also proposed.

Various categories are suggested for characterizing audio pieces, such as animal sounds, the ringing of bells, sounds of a crowd of people, laughter, machine noise, musical instruments, the male voice, the female voice, telephone sounds or sounds of water.

The choice of features used is problematic in that the computing expenditure required for extracting a feature is supposed to be moderate so as to quickly achieve a characterization, but in that, at the same time, the feature is to be characteristic of the audio piece such that two different pieces have features differing from each other.

For characterizing an audio signal, a characterization of the audio signal, or a so-called feature, which is also referred to as fingerprint, is extracted, as has already been described. Two different requirements are placed upon the type of feature. The one requirement placed upon a fingerprint is that the fingerprint is to signal the audio signal as uniquely as possible. The other requirement placed upon the fingerprint is that the fingerprint is to contain as little information as possible, i.e. that the fingerprint is to use as little memory space as possible. These two requirements conflict with each other. The simplest way to recognize this is the fact that the best "fingerprint" for an audio signal is the audio signal itself, i.e. the sequence of samples represented by the audio signal. Such a fingerprint, however, would present a large-scale violation of the second requirement, since the fingerprint of the audio signal would take up far too much memory, which would, for one thing, make it impossible to store a very large number of fingerprints for a very large number of audio signals in a music recognition database. A further disadvantage is also that the amount of computing time required by matching algorithms, which are supposed to compare a search fingerprint with a plurality of stored database fingerprints, is proportional to the size of the search fingerprint and/or the database fingerprint.

The other extreme would be, for example, to only take a mean value of all samples of a piece. This mean value requires only very little memory space and is therefore best suited both for a large music database and for matching algorithms. However, the characterizing strength of such a fingerprint would not be very robust towards a change irrelevant for a person.

An ideal compromise between the characterizing strength, on the one hand, and the data volume of the fingerprint, on the other hand, does not exist as such in general, but is typically established empirically or depends on the circumstances of the respective application in terms of memory space available and transmission capacity available. This procedure has the drawback that the different types of fingerprints are ideally suited for only one specific application, but are more or less unsuitable for other applications. It shall be pointed out in this context that audio signal identification and/or characterization is of particular interest only if there are very large feature databases whose fingerprints could be compared to a search fingerprint to either directly identify an audio signal or to characterize the audio signal to the effect that a measure of similarity of the audio signal compared to one or several of the audio signals in the database is output. If it is found that a specific type of fingerprint was indeed favorable for the one application, but was no longer favorable for the other application, renewed feature extraction processing must be performed for the large amount of audio signals whose fingerprints are stored in the database to achieve a new feature database serving as an ideal compromise for current applications in order to achieve an ideal compromise between the characterizing strength, on one hand, and the memory space, on the other hand. On the one hand, the original pieces are not at all available for a renewed feature extraction (for example, 500.000 audio pieces are used for an audio database). On the other hand, this results—if it is at all possible—in large-scale expenditure for feature extraction processing to fill and/or to "train" the "new" database.

This problem is aggravated in particular by the fact that although there is indeed a worldwide web available in the form of the internet, which in principle has an almost unlimited storage capacity, it is however, impossible to let many different "fingerprint producers" know at any time which fingerprint is most suitable for which application, such that there also is always sufficient fingerprint database material available to be able to perform useful audio signal identification and/or characterization.

A further problem is that fingerprints should also be transmitted via most varied transmission channels. A transmission channel having a very low transmission capacity is, for example, an outdoor transmission channel of a mobile phone. In addition to the characterizing strength and the storage capacity for the database, the bandwidth of the transmission channel also is a decisive factor. It would make no sense to produce a fingerprint having a high characterizing strength but which can hardly or not at all be transmitted via the narrow-band transmission channel. The ideal fingerprint for such an application is therefore specified additionally by the transmission channel via which the fingerprint, e.g. of a search database, is to be transmitted.

SUMMARY OF THE INVENTION

It is the object of the present invention to provide a flexible fingerprint concept which is adaptable to different requirements.

In accordance with one aspect, the invention provides a method for producing a fingerprint of an audio signal using information defining a plurality of predetermined fingerprint modi, all of the fingerprint modi relating to the same type of fingerprint, the fingerprint modi, however, providing different fingerprints differing from each other with regard to their data volume, on the one hand, and to their characterizing strength for characterizing the audio signal, on the other hand, the fingerprint modi being pre-determined such that a fingerprint in accordance with a fingerprint modus having a first characterizing strength is convertible to a fingerprint in accordance with a fingerprint modus having a second characterizing strength, without using the audio signal, the method including the following steps: setting a predetermined fingerprint modus of the plurality of predetermined fingerprint modi; and computing a fingerprint in accordance with the set predetermined fingerprint modus.

In accordance with a second aspect, the invention provides a method of characterizing an audio signal, the method including the following steps: producing a fingerprint of the audio signal using information defining a plurality of predetermined fingerprint modi, all of the fingerprint modi relating to the same type of fingerprint, the fingerprint modi, however, providing different fingerprints differing from each other with regard to their data volume, on the one hand, and to their characterizing strength for characterizing the audio signal, on the other hand, the fingerprint modi being predetermined such that a fingerprint in accordance with a fingerprint modus having a first characterizing strength is convertible to a fingerprint in accordance with a fingerprint modus having a second characterizing strength, without using the audio signal, the method including the following steps: setting a predetermined fingerprint modus of the plurality of predetermined fingerprint modi; and computing a fingerprint in accordance with the set predetermined fingerprint modus; comparing the computed fingerprint with a plurality of stored fingerprints representing known audio signals to characterize the audio signal, the stored fingerprints having been produced in accordance with one of the plurality of fingerprint modi, the step of comparing including the following steps: examining whether the search fingerprint and the database fingerprint have been produced in accordance with different fingerprint modi; converting the search fingerprint and/or the database fingerprint so that the fingerprints to be compared exist in accordance with the same fingerprint modus; and performing the comparison using the fingerprints existing in the same fingerprint modus.

In accordance with a third aspect, the invention provides a fingerprint representation for an audio signal, with a fingerprint, the fingerprint being configured in accordance with one of a plurality of predetermined fingerprint modi, all of the fingerprint modi relating to the same type of fingerprint, the fingerprint modi, however, providing different fingerprints differing from each other with regard to their data volume, on the one hand, and to their characterizing strength for characterizing the audio signal, on the other hand, the fingerprint modi being predetermined such that a fingerprint in accordance with a fingerprint modus having a first characterizing strength is convertible to a fingerprint in accordance with a fingerprint modus having a second characterizing strength, without using the audio signal.

In accordance with a fourth aspect, the invention provides an apparatus for producing a fingerprint of an audio signal using information defining a plurality of predetermined fingerprint modi, all of the fingerprint modi relating to the same type of fingerprint, the fingerprint modi, however, providing different fingerprints differing from each other with regard to their data volume, on the one hand, and to their characterizing strength for characterizing the audio signal, on the other hand, the fingerprint modi being predetermined such that a fingerprint in accordance with a fingerprint modus having a first characterizing strength is convertible to a fingerprint in accordance with a fingerprint modus having a second characterizing strength, without using the audio signal, the apparatus having: means for setting a predetermined fingerprint modus of the plurality of predetermined fingerprint modi; and means for computing a fingerprint in accordance with the set predetermined fingerprint modus.

In accordance with a fifth aspect, the invention provides an apparatus for characterizing an audio signal, having: means for producing a search fingerprint of the audio signal using information defining a plurality of predetermined fingerprint modi, all of the fingerprint modi relating to the same type of fingerprint, the fingerprint modi, however, providing different fingerprints differing from each other with regard to their data volume, on the one hand, and to their characterizing strength for characterizing the audio signal, on the other hand, the fingerprint modi being predetermined such that a fingerprint in accordance with a fingerprint modus having a first characterizing strength is convertible to a fingerprint in accordance with a fingerprint modus having a second characterizing strength, without using the audio signal, the means having: means for setting a predetermined fingerprint modus of the plurality of predetermined fingerprint modi; and means for computing a fingerprint in accordance with the set predetermined fingerprint modus; means for comparing the computed fingerprint with a plurality of stored fingerprints representing known audio signals to characterize the audio signal, the stored fingerprints having been produced in accordance with one of the plurality of fingerprint modi, the means having: means for examining whether the search fingerprint and the database fingerprint have been produced in accordance with different fingerprint modi; means for converting the search fingerprint and/or the database fingerprint so that the fingerprints to be compared exist in accordance with the same fingerprint modus; and means for performing the comparison using the fingerprints existing in the same fingerprint modus.

The present invention is based on the findings that a fingerprint concept which is as universal as possible may be obtained by the fact that the fingerprint has been created in accordance with a modus of a plurality of predetermined fingerprint modi, all of the fingerprint modi relating to the same type of fingerprint, the fingerprint modi, however, providing different fingerprints which differ from each other with regard to their data volume, on the one hand, and with regard to their characterizing strength for characterizing an audio signal, on the other hand. In accordance with the invention, the fingerprint modi are pre-determined such that a fingerprint in accordance with a fingerprint modus having a first characterizing strength may be converted into a fingerprint in accordance with a fingerprint modus having a second characterizing strength, without using the audio signal itself. This "scalable" fingerprint enables providing, for example, a database which has fingerprints having a high characterizing strength and involving a large amount of data. The expensive database fingerprint which has been produced in accordance with one of the predetermined fingerprint modi may be readily converted into a "lower" fingerprint, which has a lower characterizing strength, without subjecting the audio signal itself to a feature extraction.

Preferably, it is always that fingerprint, of the search fingerprint and of the database fingerprint, that has higher characterizing strength that is converted, such that two fingerprints which are actually comparable are compared with each other. If a scaling with many different fingerprint modi is provided in accordance with the invention, the database is suited to process as many different fingerprints, i.e. fingerprints produced in accordance with different fingerprint modi, as there are fingerprint modi in total.

The advantage is that using the same fingerprint database, fingerprints having a very low characterizing strength, but also fingerprints having a very high characterizing strength may be processed, so that, depending on the approved predetermined fingerprint modi, a suitable fingerprint modus may be found for each application, while one and the same fingerprint database may nevertheless be used.

This concept has the further advantage that producers of fingerprints for audio databases are deprived of the task of constantly producing different fingerprints for changing applications, but that a scalable fingerprint is produced once, which may then be used for a plurality of applications due to its scalability feature. On the other hand, the users of such search databases are given sufficient flexibility in that they may produce, if the circumstances require so, either a fingerprint having very low characterizing strength which may, however, be transmitted very quickly, whereas the same user may produce a fingerprint having very high characterizing strength in a different application in which characterizing strength is more important than the data volume of the fingerprint. The user may access one and the same database for both cases of application, which simplifies the whole concept of context-based audio signal description to a substantial extent and therefore renders it more user-friendly. It is in particular the user-friendliness and ease of handling which are decisive for the product to achieve widespread commercial success in the market place.

Preferably, scalability with regard to frequency and/or scalability with regard to time are used. The scalability with regard to frequency is achieved, in accordance with a preferred embodiment of the present invention, in that the fingerprint modi each contain separate fingerprint information for separate sub-bands of the audio signal, and in that the fingerprint modi differ from each other in that they include separate fingerprint information for a different number of sub-bands. This specifying of sub-bands is the same for all fingerprint modi. If a database having fingerprints with very high characterizing strength is produced, i.e. if the fingerprint modus in which the fingerprints for the database have been produced contains separate fingerprint information for, for example, 20 sub-bands of the audio signal, other fingerprint modi having less characterizing strength would lead to fingerprints containing, for example, separate fingerprint information for only 15, 10, 5 or only one single sub-band. All fingerprints produced in accordance with the different fingerprint modi are readily downward compatible, since in a matching operation with the database only those fingerprint information are taken from the database fingerprint for the sub-bands which are included in the search fingerprint as well. In an extreme case, it would only be the fingerprint information of a single sub-band that would be used for a matching operation of 20 separate items of fingerprint information of a fingerprint, if the search fingerprint also includes only fingerprint information for one single sub-band.

A further preferred alternative is the scalability over time. A fingerprint having relatively low characterizing strength contains, for example, fingerprint information of 10 blocks of samples of the audio signal, whereas a fingerprint having high characterizing strength includes fingerprint information per block of samples of the audio signal. With the same block length for both fingerprints, a correspondingly large number of items of fingerprint information successive in time and having high characterizing strength are combined for downward conversion to produce from these one converted fingerprint characterizing the same number of samples as the fingerprint having the low characterizing strength. Here, the fingerprint modi differ from each other in that a fingerprint modus having very low characterizing strength processes many blocks of samples into a single fingerprint, whereas a fingerprint modus having very high characterizing strength produces, for example, one fingerprint per block. With a predetermined block size a fingerprint having low characterizing strength may be produced from the corresponding number of fingerprint modi having high characterizing strength without having to subject the audio signal itself to a renewed feature extraction, so as to be able to perform, for example, a database comparison.

BRIEF DESCRIPTION OF THE DRAWINGS

Preferred embodiments of the present invention will be explained in more detail below with reference to the accompanying figures, in which:

FIG. 3b shows a schematic representation of different fingerprint representations that may be produced by different fingerprint modi from the sub-band sub-division shown in FIG. 3a;

FIG. 4b shows a schematic overview of various fingerprint representations which may be produced in accordance with different fingerprint modi from the block subdivision shown in FIG. 4a.

DESCRIPTION OF PREFERRED EMBODIMENTS

Figure 5:
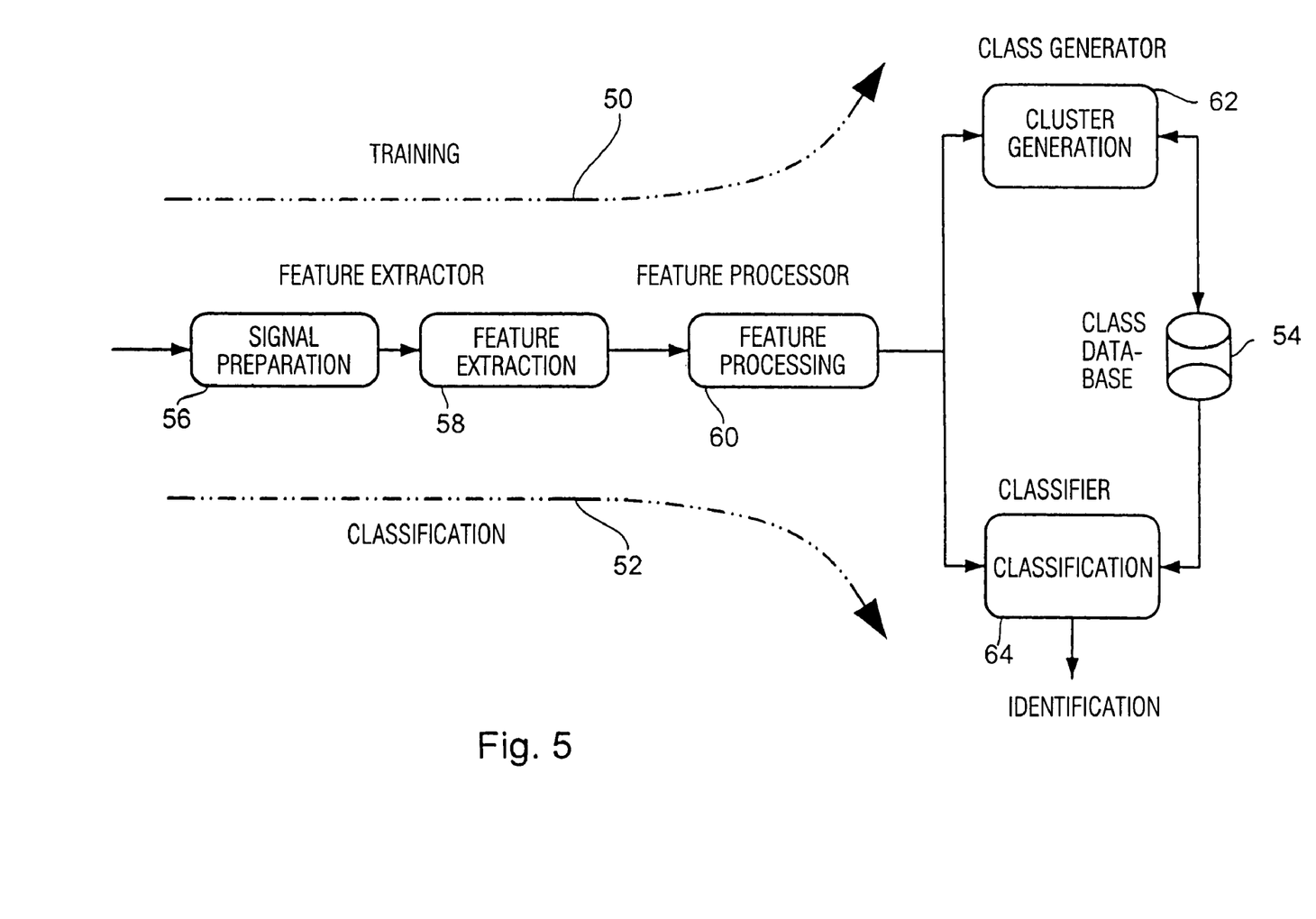
FIG. 5 shows a basic block diagram of a pattern recognition system.

Reference shall be made below to FIG. 5, which shows a schematic overview of a pattern recognition system wherein the present invention may be advantageously used. In principle, in a pattern recognition system shown in FIG. 5 a differentiation is made between two operating modi, to be precise between the training modus 50 and the classification modus 52.

In the training modus, data is "trained in", i.e. added to the system and subsequently included in a database 54.

In the classification modus an attempt is made to compare a signal to be characterized with the entries existing in the database 54 and to classify it.

The pattern recognition system includes means 56 for signal preprocessing, downstream means 58 for feature extraction, means 60 for feature processing, means 62 for cluster generation, and means 64 for performing a classification so as to make a statement about the content of the signal to be characterized, for example as a result of the classification modus 52, to the effect that the signal is identical to the signal xy, which has been trained in in a previous training modus.

The functionality of the individual blocks of FIG. 5 will be dealt with below.

Along with block 58, block 56 forms a feature extractor, whereas block 60 represents a feature processor. Block 56 converts an input signal to a uniform target format, such as the number of channels, the sampling rate, the resolution (in bits per sample), etc. This is useful and necessary in that no condition should be set with regard to the source from which the input signal originates.

Means 58 for feature extraction serves to restrict the usually large amount of information at the output of means 56 to a small amount of information. The signals to be examined mostly have a high data rate, i.e. a large number of samples per time slot. The restriction to a small amount of information must take place in such a manner that the essence of the original signal, i.e. the specific nature of same, is not lost. Within means 58, stipulated characteristic properties, such as, in general, loudness, basic frequency, etc. and/or, in accordance with the present invention, tonality features and/or the SFM, are extracted from the signal. The tonality features thus obtained are supposed to contain, as it were, the essence of the signal examined.

In block 60, the feature vectors previously computed may be processed. Simple processing comprises normalizing the vectors. Potential feature processing comprises linear transformations, such as Karhunen-Loeve transformation (KLT) or linear discriminant analysis (LDA), which are known in the art. Further transformations, in particular also non-linear transformations, may also be used for feature processing.

The class generator serves to combine the feature vectors processed into classes. These classes correspond to a compact representation of the associated signal. The classifier 64 finally serves to associate a feature vector produced with a predefined class and/or a predefined signal.

Figure 1:
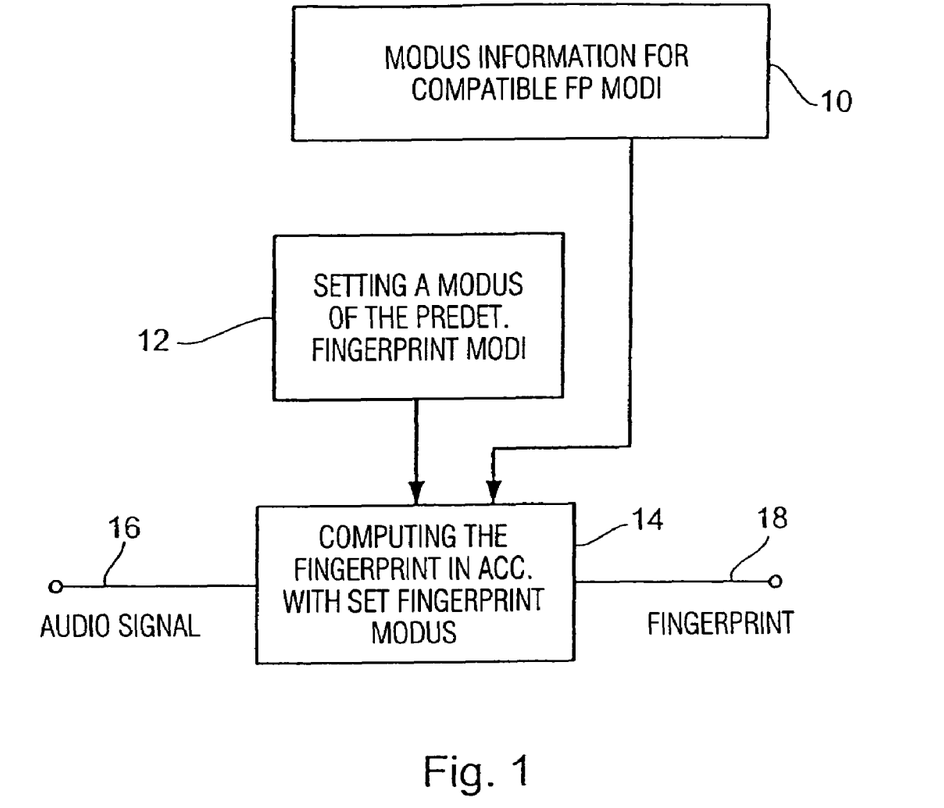
FIG. 1 shows a block diagram for producing a fingerprint.

FIG. 1 schematically shows an apparatus for producing a fingerprint of an audio signal, as may be present, for example, in block 58 of FIG. 5. For producing a fingerprint of an audio signal, use is made of information defining a plurality of predetermined fingerprint modi, this modus information relating to mutually compatible fingerprint modi being stored by means of means 10. The fingerprint modi defined by the modus information stored in means 10 all relate to the same type of fingerprint, the fingerprint modi, however, providing different fingerprints differing, on the one hand, with a view to their data volume, and, on the other hand, with a view to their characterizing strength for identifying the audio signal itself. In accordance with the invention, the fingerprint modi are predetermined such that a fingerprint in accordance with a fingerprint modus having a first characterizing strength is convertible into a fingerprint in accordance with a fingerprint modus having a second characterizing strength without using the audio signal. Convertibility from the fingerprint having higher characterizing strength to the fingerprint having lower characterizing strength is preferred. Depending on the particular type of application, however, it is also possible to ensure upward compatibility, for example by interpolation, etc.

The inventive apparatus further includes means 12 for setting a fingerprint modus of the plurality of predetermined fingerprint modi. Within means 14 for computing the fingerprint in accordance with the fingerprint modus fed by means 12, a fingerprint of an audio signal set via an input 16 is finally computed and output at an output 18. Means 14 for computing the fingerprint in accordance with the fingerprint modus set by means 12 is connected to storage means 10 so as to apply the respective computing specifications depending on the fingerprint modus.

Means 14 for computing the fingerprint in accordance with a set fingerprint modus will be dealt with in more detail below. It has been found that the tonality of an audio signal is well suited as a feature which is robust, on the one hand, and easily scalable, on the other hand.

Various methods may be employed for computing the tonality measure of a piece. A time signal to be characterized may be converted into the spectral domain using means, so as to produce a block of spectral coefficients from a block of time-related samples. As will be explained below, a specific tonality value may be determined for each spectral coefficient and/or for each spectral component, so as to classify, for example by means of a yes/no determination, whether or not a spectral component is tonal. Using the tonality values for the spectral components, and the energy and/or power of the spectral components, it is possible to compute the tonality measure for the signal in a multiplicity of different ways.

Due to the fact that a quantitative tonality measure is obtained, it is also possible to indicate distances and/or similarities between two tonality-indexed pieces, it being possible to classify pieces as been similar if their tonality measures differ only by a difference smaller than a predetermined threshold, whereas other pieces may be classified as dissimilar if their tonality indices differ by a difference larger than a dissimilarity threshold. In addition to the difference between two tonality measures, further quantities may be used for determining the tonality distance between two pieces, such as the amount of the difference between two values, the square of a difference, the quotient between two tonality measures minus one, the correlation between two tonality measures, the distance metric between two tonality measures, which are n-dimensional vectors, etc.

It shall be pointed out that the signal to be characterized does not necessarily have to be a time signal, but that same may also be, for example, an MP3-coded signal consisting of a sequence of Huffman code words produced from quantized spectral values.

The quantized spectral values were produced from the original spectral values by means of quantizing, the quantizing having been selected such that the quantizing noise introduced by the quantization is below the psycho-acoustic masking threshold. In such a case, the coded MP3 data stream may be used directly to compute the spectral values, for example by means of an MP3 decoder. It is not necessary to perform a conversion to the time domain and then another conversion to the spectral domain perform determining the tonality, but the spectral values computed within the MP3 decoder may be immediately used to compute the tonality per spectral component or the SFM (spectral flatness measure). Therefore, if spectral components are used for determining the tonality, and if the signal to be characterized is an MP3 data stream, means 40 are designed like a decoder, however without the inverse filter-bank.

The measure for the spectral flatness (SFM) is computed by means of the following equation.

$$SFM = \frac{\left[\prod_{n=0}^{N-1} X(n)\right]^{\frac{1}{N}}}{\frac{1}{N}\sum_{n=0}^{N-1} X(n)}$$

In this equation X(n) represents the square of absolute value of a spectral component with the index n, whereas N represents the total number of spectral coefficients of a spectrum. It may be seen from the equation that the SFM equals the quotient of the geometric mean of the spectral components and the arithmetic mean of the spectral components. As is known, the geometric mean is always smaller than or, at the most, the same as the arithmetic mean, so that the SFM has a range of values between 0 and 1. In this context, a value near 0 indicates a tonal signal, and a value near 1 indicates a rather noise-like signal having a flat spectral curve. It shall be pointed out that the arithmetic mean and the geometric mean are equal only if all X(n) are identical, which corresponds to a completely atonal, i.e. noise-like or pulse-like signal. However, if, in an extreme case, only one spectral component has a very high value, whereas other spectral components X(n) have very small values, the SFM will have a value near 0, which indicates a very tonal signal.

The SFM has been described in "Digital Coding of Waveforms", Englewood Cliffs, N.J., Prentice-Hall, N. Jayant, P. Noll, 1984, and was initially defined as a measure for the encoding gain to be maximally achieved from a redundancy reduction. The tonality measure may be then predetermined from the SFM.

A further possibility of determining the tonality of the spectral values is to determine peaks in the power density spectrum of the audio signal, as is described in MPEG-1 audio ISO/IEC 11172-3, Annex D1 "Psycho-acoustic Model 1". Here, the level of a spectral component is determined. Subsequently, the levels of two spectral components surrounding the one spectral component are determined. The spectral component will be classified as tonal if the level of the spectral component exceeds a level of a surrounding spectral component by a predetermined factor. In the art, the predetermined threshold is taken to be 7 dB, it being possible, however, to use any other predetermined thresholds in the present invention. Thereby it may be indicated for each spectral component whether or not same is tonal.

A further possibility of determining the tonality of a spectral component is to evaluate the time-related predictability of the spectral component. Here, reference shall again be made to MPEG-1 audio ISO/IEC 11172-3, Annex D2 "Psycho-acoustic Model 2". Generally, a current block of samples of the signal to be characterized is converted to a spectral presentation to obtain a current block of spectral components. Subsequently, the spectral components of the current block of spectral components are predicted using information from samples of the signal to be characterized which precede the current block, i.e. using information from the past. Then a prediction error is determined from which a tonality measure may then be derived.

A further possibility of determining the tonality has been described in U.S. Pat. No. 5,918,203. Again, use is made of a positive real-valued presentation of the spectrum of the signal to be characterized. This presentation may include the values, the squares of absolute values, etc. of the spectral components. In one embodiment, the values or squasquares of absolute values of the spectral components are initially logarithmically compressed and then filtered using a filter with a differentiating characteristic so as to obtain a block of spectral components filtered in a differentiating manner.

In another embodiment, the values of the spectral components are initially filtered using a filter with a differentiating characteristic to obtain a numerator, and then filtered using a filter with an integrating characteristic to obtain a denominator. The quotient of a value, filtered in a differentiating manner, of a spectral component, and the value, filtered in an integrating manner, of the same spectral component then yields the tonality value for these spectral components.

By means of these two procedures, slow changes between adjacent values of spectral components are suppressed, whereas abrupt changes between adjacent values of spectral components in the spectrum are emphasized. Slow changes between adjacent values of spectral components indicate atonal signal components, whereas abrupt changes indicate tonal signal components. The logarithmically compressed and differentiatingly filtered spectral components and/or the quotients may then be again used to compute a tonality measure for the spectrum contemplated.

Even though it has been said above that one tonality value is computed per spectral component, it is preferred, with a view to low computing expenditure, to add, for example, the squares of absolute values of two adjacent spectral components in each case and then to compute a tonality value for each result of the addition by means of one of the methods mentioned. Each type of additive grouping of squares of absolute values and/or values of spectral components may be used to compute tonality values for more than one spectral component.

A further possibility of determining the tonality of a spectral component is to compare the level of a spectral component to a mean value of levels of spectral components in a frequency band. The width of the frequency band containing the one spectral component whose level is compared to the mean value of, e.g., the values or squares of absolute values of the spectral components, may be selected as required. One possibility, for example, is to choose the band to be narrow. Alternatively, the band could also be selected to be broad, or it could be selected with a view to psycho-acoustic criteria. This is how the influence of short-term power setbacks in the spectrum may be reduced.

Even though above the tonality of an audio signal was determined by means of its spectral components, this may also take place in the time domain, i.e. using the samples of the audio signal. To this end, LPC analysis of the signal could be performed to estimate a prediction gain for the signal. The prediction gain is inversely proportional to the SFM and is therefore a measure of the tonality of the audio signal as well.

In a preferred embodiment of the present invention, it is not only one value per short-term spectrum that is indicated, but the tonality measure is a multi-dimensional vector of tonality values. For example, the short-term spectrum may be subdivided into four mutually adjacent and preferably non-overlapping areas and/or frequency bands, one tonality value being determined for each frequency band. This means that a 4-dimensional tonality vector is obtained for a short-term spectrum of the signal to be characterized. In order to allow better characterization, it would further be preferred to process, for example, four successive short-term spectra as described above, so that in total a tonality measure is yielded which is a 16-dimensional vector or generally an n×m-dimensional vector, n representing the number of tonality components per frame or block of samples, whereas m represents the number of blocks and/or short-term spectra contemplated. The tonality measure would then be a 16-dimensional vector, as has been set forth. In order to better accommodate the waveform of the signal to be characterized, it is moreover preferred to compute several such, e.g. 16-dimensional, vectors and then to process them statistically so as to compute, for example, variance, mean value, or central moments of a higher order from all n×m-dimensional tonality vectors of a piece having a predetermined length so as to thereby index this piece.

Generally speaking, the tonality may thus be computed from parts of the entire spectrum. It is therefore possible to determine the tonality/noise-likeness of a subspectrum or of several subspectra and thus to achieve a more refined characterization of the spectrum and thus of the audio signal.

In addition, short-term statistics from tonality values, such as, for example, means value, variance and central moments of a higher order, may be computed as the tonality measure. These are determined by means of statistical techniques using a time sequence of tonality values and/or tonality vectors, and therefore provide an essence over a longer portion of a piece.

On top of that, it is also possible to use differences between tonality vectors successive in time or linearly filtered tonality values, it being possible to use, for example, IIR filters or FIR filters as linear filters.

In computing the SFM it is also preferred, for reasons of savings on computing time, to add or to average e.g. two squares of absolute values mutually adjacent in terms of frequency, and to perform the SFM computation on the basis of this coarsened positive and real-valued spectral presentation. In addition, this leads to an increased robustness towards narrow-band frequency drops and to a lower computation expenditure.

Again, with reference to FIG. 1, means 12 for setting a fingerprint modus of the predetermined fingerprint modi will be dealt with below in more detail. Means 12 is assigned the task of choosing, from the plurality of predefined fingerprint modi, and setting that fingerprint modus which is best suited for a certain application. The choice may be effected either empirically or automatically by means of specified check-matching operations. In such check-matching operations, for example, several known audio signals are processed in accordance with different fingerprint modi to produce different fingerprints exhibiting characterizing strength. Subsequently, a sample-matching operation is performed in a database using these different fingerprints, all of which, however, represent the same type of fingerprint, namely e.g. the tonality and/or a tonality measure of the audio signal. By means of a specified threshold of error outputs for the individual fingerprints, one of the predetermined fingerprints modi, for example which meets a threshold criterion, may then be selected.

Alternatively, means 12 may select the fingerprint modus which provides a fingerprint which, however, may only just be able to be transmitted via a band-limited transmission channel, for example, due to its data volume, and means 12 may do so independently of threshold values, but, for example, depending on a transmission channel. Depending on the channel occupancy and/or the channel capacity available, either a fingerprint modus having high characterizing strength, or, if the channel is occupied or band-limited to a large extent, a fingerprint modus having relatively low characterizing strength may be set.

The same applies to the case wherein the fingerprint is not to be transmitted but to be stored. Depending on the memory resources available, a fingerprint modus which is memory-intensive and therefore has high characterizing strength, or a fingerprint modus which is memory-saving, but has relatively low characterizing strength, may be set by means 12.

Figure 2:
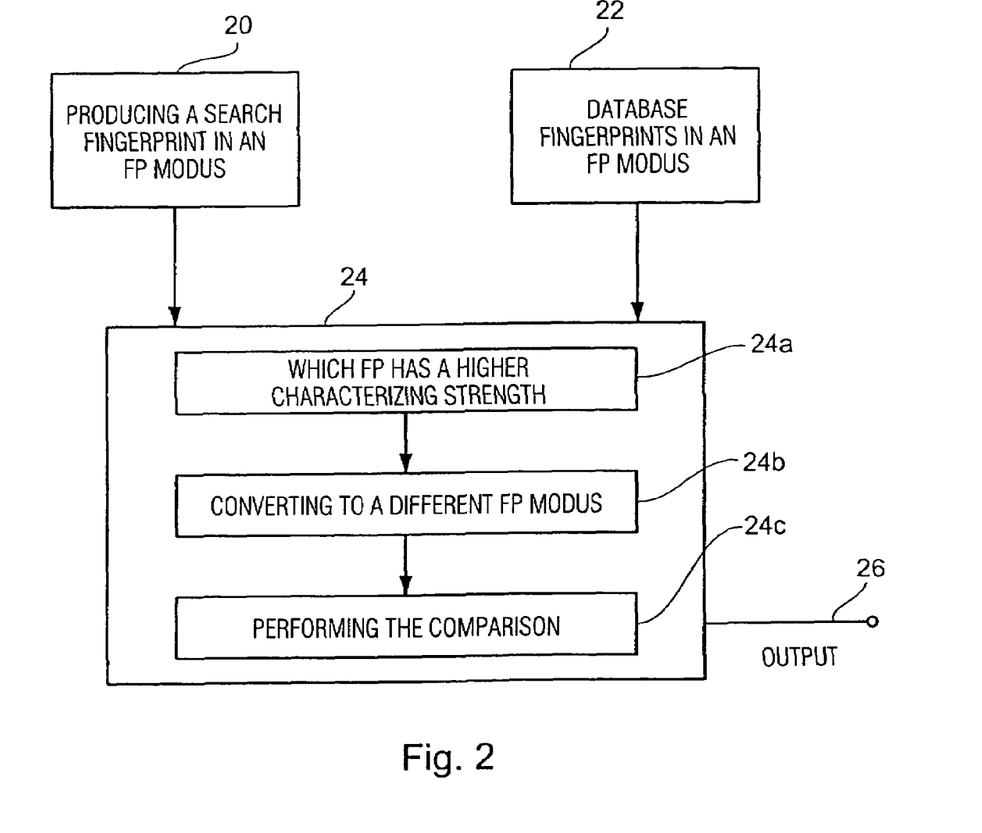
FIG. 2 shows a block diagram of an inventive apparatus for characterizing an audio signal.

FIG. 2 shows a block diagram of an inventive apparatus for characterizing an audio signal. Such an apparatus includes means for producing a search fingerprint in one of the predetermined fingerprint modi. These means are denoted by reference numeral 20 in FIG. 2 and are preferably implemented such as has been described in connection with FIG. 1. The apparatus for characterizing an audio signal further includes a database 22, wherein database fingerprints are stored which have also been computed in one of the predetermined fingerprint modi.

The apparatus shown in FIG. 2 further includes means 24 for comparing the search fingerprint, which has been produced by means 20, with the database fingerprints. Initially, it is established in means 24a whether the search fingerprint and the database fingerprint to be compared with the former have the same characterizing strength, i.e. have been produced by the same fingerprint modus, or whether the search fingerprint has been produced in accordance with a fingerprint modus different from that of the database fingerprint. If it is established that one of the fingerprints has higher characterizing strength than the other, a conversion is performed in means 24b, such that after the conversion, both the search fingerprint and the database fingerprint have the same characterizing strength, i.e. are comparable or exist in accordance with the same fingerprint modus. It is not until this condition has been met that means 24c perform a comparison of both fingerprints. Such a comparison will then possibly yield, as an output 26, that the audio signal represented by the search fingerprint corresponds to the audio signal represented by the current database fingerprint. Alternatively, the output 26 may also exist in establishing a similarity having a certain probability, i.e. a similarity measure.

Preferably, means 24a are arranged to find out which fingerprint has the higher characterizing strength. This fingerprint is then scaled down to the characterizing strength, i.e. to the fingerprint modus, of the fingerprint having the lower characterizing strength of the two fingerprints. Alternatively, for example if desired for reasons of a fast search, both fingerprints may be scaled down to a fingerprint modus providing fingerprints having lower characterizing strength than that of the search fingerprint and the database fingerprint.

Depending on the application, it may also be necessary to scale up, by means of interpolation, the fingerprint having the low characterizing strength, this alternative, however, providing useful results only if the type of fingerprint allows interpolation.

As has already been explained, there are contradictory requirements in specifying the fingerprint modus. On the one hand, there is a large amount of interest involved in achieving a data reduction which is as comprehensive as possible, i.e. to achieve a small fingerprint size to be able to retain as many search fingerprints as possible in the memory of a computer and to be able to render further processing more efficient.

On the other hand, as the fingerprint size becomes smaller, there is an increasing risk that a correct differentiation may no longer be made between the pieces registered in the database. This relates particularly to a large audio pieces database, which may include, for example, 500,000 titles, and to applications wherein the audio pieces are exposed to pronounced distortions before the identification process, for example with an acoustic transmission of the signal or with a lossy compression.

Of course, it would be possible to define, for this reason, more compact fingerprint formats, which are not as robust, and formats which are not as compact but which provide correspondingly better discriminatory properties. However, as has been set forth, this requires that the expensive fingerprint databases must be set up several times, i.e. once in every format, and kept on store, particularly since a description in a first type of fingerprint cannot generally be compared with a fingerprint of a different type.

To eliminate these problems, the present invention provides a universal, scalable description format which provides, in a flexible manner, depending on the application, a varying compromise between the characterizing strength and the compactness of the fingerprint, without the comparability of the fingerprints being lost. This is preferably achieved by scalability in two dimensions, one dimension being the scalability in the number of bands, and the other dimension being the scalability in time. Generally, the scalability in the number of bands is based on a spectral dissection of the audio signal. The frequency domain of the audio signal, or a subset of same, for example 250 Hz to 4 kHz, is divided into frequency bands wherein the fingerprints are computed on the basis of the features contemplated, e.g. the tonality measure. Due to the frequency separation, there exist independent items of information about the characteristic of the signal in each of the bands. All fingerprints use the same band partitioning and preferably start from the same lower cut-off frequency. A fingerprint modus providing a compact fingerprint having lower characterizing strength, however, contains fewer bands and thus a smaller range of frequencies than a more generous fingerprint modus, the form which, however, is less compact. Nevertheless, both types of description may be compared in a useful manner in their common frequency bands without renewed processing of the audio signal.

A preferred embodiment is the use of a band partitioning which is at least partially logarithmic and leans heavily on the frequency scale and/or frequency discrimination used by human hearing for frequencies which are not too low, for example for frequencies higher than 500 Hz. It is preferred not to use the above-mentioned logarithmic partitioning below e.g. 500 Hz and to partition the bands below 500 Hz, for example, to have the same width, such as to partition them into five bands of 100 Hz each. This partitioning roughly corresponds to the Bark scale.

Figure 3A:
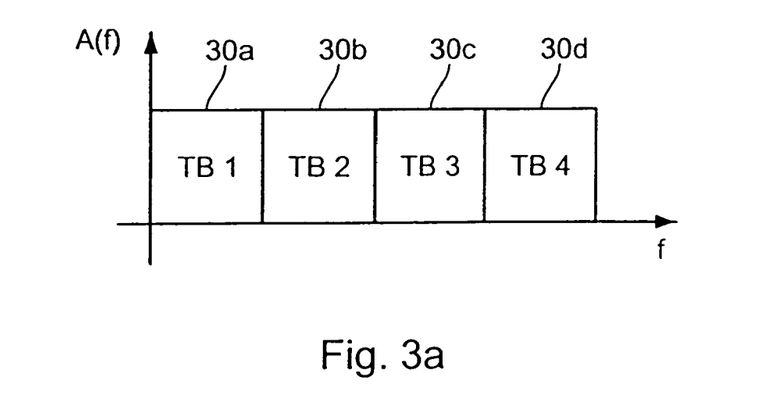
FIG. 3a shows a representation of the subdivision of an audio signal into various sub-bands.
Figure 3B:
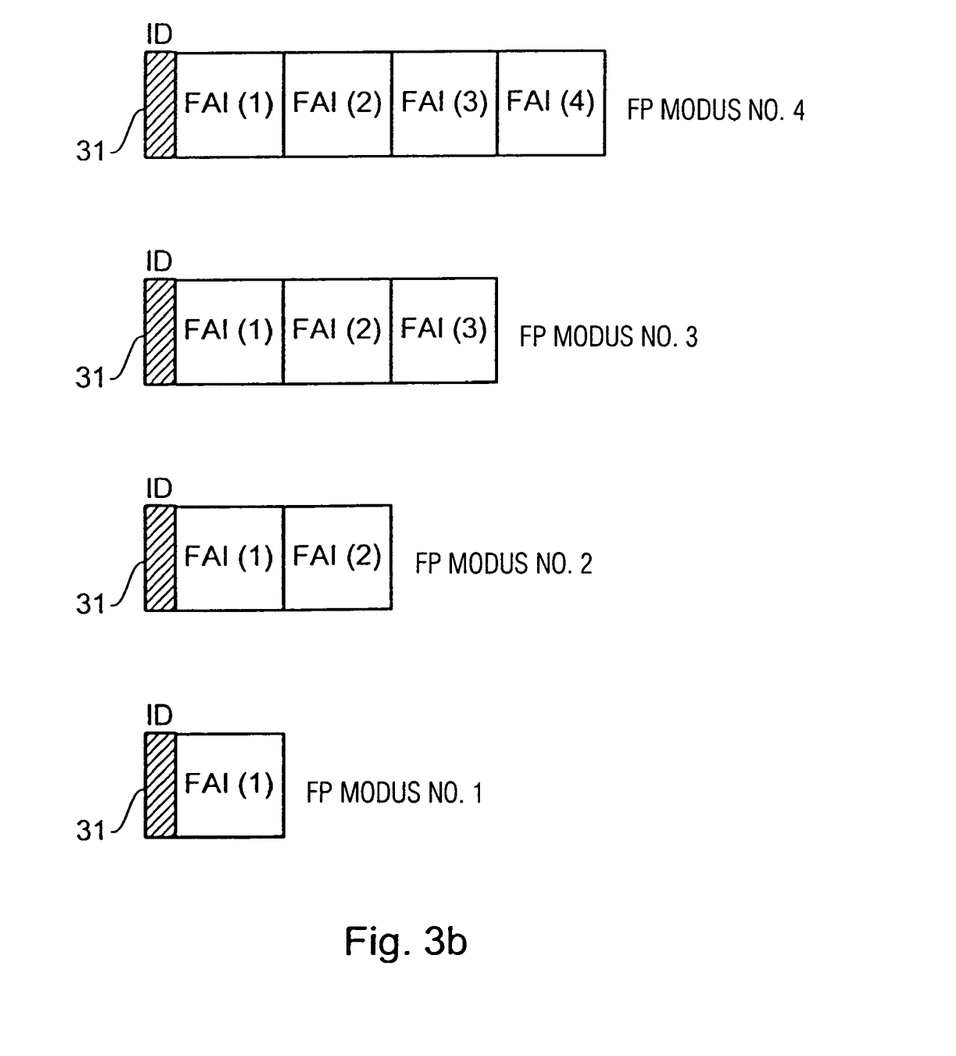

An example of the scalability in the number of bands will be given below with reference to FIGS. 3a and 3b. For reasons of presentation, an audio signal is partitioned into four sub-bands 30a to 30d, as is shown in FIG. 3a. FIG. 3b shows different fingerprint representations, as may be produced by different fingerprint modi. Each fingerprint representation of FIG. 3b contains an identifier portion 31 indicating the number of sub-bands for which fingerprint information is contained, i.e. indicating the fingerprint modus in accordance with which the fingerprint in question has been produced. Fingerprint modus No. 4 provides the most memory-intense fingerprint representation, which is, however, also the one with the highest characterizing strength, since the fingerprint representation contains fingerprint information (FPI) both for sub-band 1 and for the other three sub-bands 2 to 4. Fingerprint modus No. 3, in contrast, provides a slightly more compact fingerprint representation, which, however, already has lower characterizing strength, since separate items of fingerprint information are contained only for the first three sub-bands. Fingerprint modus No. 2 provides a relatively compact representation, which, however, has even lower characterizing strength, since fingerprint information is contained only for the two lowest sub-bands. Fingerprint modus No. 1, in contrast, provides a very compact fingerprint representation, which, however, has the least characterizing strength, since only fingerprint information of the lowest sub-band 30a is contained.

The function of block 24b of FIG. 2, i.e. the fingerprint conversion from one fingerprint modus into another fingerprint modus, will be dealt with below with reference to FIG. 3b. It shall be assumed, nearly by way of example, that a database fingerprint has been produced in accordance with fingerprint modus No. 4. The database thus contains fingerprints having very high characterizing strength. A search fingerprint has been produced, for example, in accordance with fingerprint modus No. 2. Once means 24a of FIG. 2 has established, for example by means of the fingerprint identifier 31 of FIG. 3b, that the search fingerprint and the database fingerprint have been produced in accordance with different fingerprint modi, the fingerprint having the higher characterizing strength, i.e. the database fingerprint, is subjected to a conversion. In the embodiment shown in FIG. 3b, the conversion consists in that the fingerprint information of the third sub-band and the fingerprint information of the fourth sub-band of the database fingerprint are no longer taken into consideration, which is to say that they no longer play a role in the matching operation. Thus, only fingerprint information of the first sub-band and fingerprint information of the second sub-band are compared with each other. Alternatively, the database fingerprint having been produced in accordance with fingerprint modus No. 4, and the search fingerprint having been produced in accordance with fingerprint modus No. 2 could both be converted into fingerprint modus No. 1, which is advantageous in particular if a fast matching operation is desired.

It shall be pointed out that it is not crucial for the database fingerprint to have higher characterizing strength than the search fingerprint. For example, if only an older database exists which has lower characterizing strength, whereas the search fingerprints are fingerprints having higher characterizing strength, the process may be reversed, such that the search fingerprints are converted into a form which has lower characterizing strength but is more compact, and that the matching operation is subsequently performed.

Even though in FIG. 3a, the sub-bands 1 to 4 (30a to 30b) have been drawn in a non-overlapping manner, it shall be pointed out that even a little overlap of the sub-bands leads to an increased robustness of the changes in pitch. To increase the robustness of the representation towards signal changes involving a change in the signal pitch, for example a sample rate conversion or a change in the pitch of a signal which is played back a little bit faster or slower, a certain band overlap is preferred. In the event of a change in pitch, there is the problem that signal portions which are in a certain frequency band (n) for an unchanged signal may, under certain circumstances, come to lie in the band n−1 or n+1 due to the change in frequency, for example an extension or compression of the spectrum, so that clearly different feature values arise and the recognition rate drops accordingly. In the preferred embodiment of the present invention, this effect is alleviated by the fact that there is a certain frequency range between adjacent bands, e.g. by using a number of DFT lines in both frequency bands. As an indication, an overlap of the frequency ranges of e.g. 10% is preferred, it being possible to select said overlap to be larger if more pronounced extensions or compressions of the spectrum are to be expected.

Figure 4A:
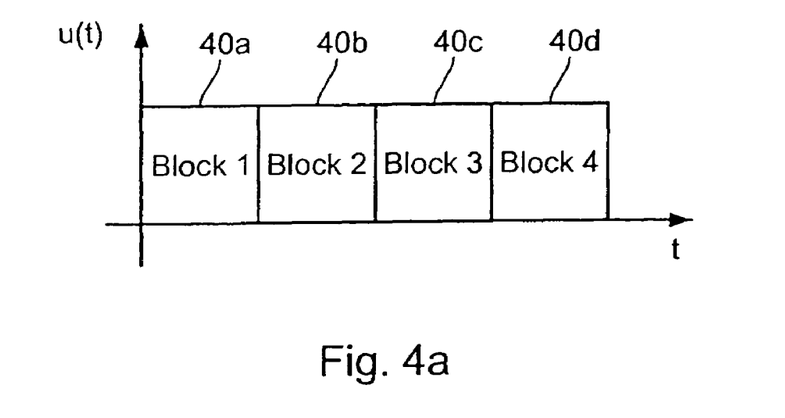
FIG. 4a shows a representation of a block subdivision of an audio signal over time.

A further dimension of the scalability is provided by time. By using the mean value and variance for combining a number n of individual feature values, the time-related granularity of a fingerprint may be set. A compact description selects a higher value for n and therefore a higher-scale time-related combination than a more generous, but less compact description. To illustrate this, FIGS. 4a and 4b will be explained in more detail below. FIG. 4a shows block-wise processing of an audio signal u(t) over time t, four blocks 40a to 40d successive in time being represented for the sake of clarity. All of blocks 40a to 40d have the same length, i.e. the same number of samples. A fingerprint modus No. 3 will provide a representation having very high characterizing strength, since for each block 1 to block 4, specific fingerprint information is computed and stored. In contrast, fingerprint modus No. 2 already provides a fingerprint representation which has lower characterizing strength but is more compact in terms of memory, since the fingerprint information is always formed from two successive blocks, i.e. from block 1 and 2, on the one hand, and from block 3 and block 4, on the other hand. The fingerprint representation which is most favorable in terms of memory but has the lowest characterizing strength is finally provided by fingerprint modus No. 1, which includes fingerprint information of all blocks 1 to 4.

Figure 4B:
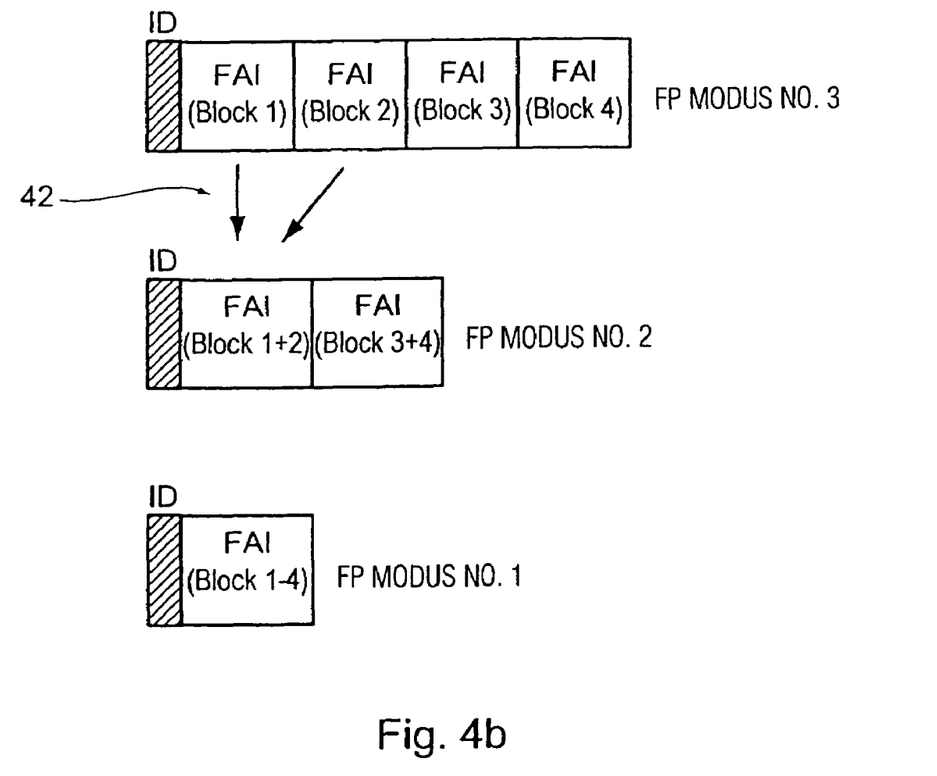

If fingerprint information having been produced in accordance with fingerprint modus No. 3 are stored in a database, and if the search fingerprint has been produced in accordance with fingerprint modus No. 2, the database fingerprint is converted such that the first two blocks are combined and are then compared to the first fingerprint information of the search fingerprint, this procedure being repeated for subsequent blocks 3 and 4. At this point it would also be possible, again, to convert both the database fingerprint and the search fingerprint to a fingerprint representation in accordance with fingerprint modus No. 1. In real applications it is preferred to combine fingerprint information from n blocks such that the fingerprint representation contains the mean value/or the variance of the fingerprint information of the individual blocks. The mean value and the variance are defined as follows:

$$\text{Mean value: } M_n(F) = 1/n \cdot \sum_{i=0}^{n-1} F_i$$

$$\text{Variance: } V_n(F) = 1/n \cdot \sum_{i=0}^{n-1} (F_i - M_n(F))^2$$

$$= \left[ 1/n \cdot \sum_{i=0}^{n-1} F_i^2 \right] - M_n(F)^2$$

In both above equations, n is an index indicating the number of blocks or bands etc. that combine a certain number of items of fingerprint information $F_i$ to form the mean value $M_n$ from same. In the above definition of variance it shall be pointed out that the variance of a block and/or band which is not useful equals zero.

With reference to FIG. 4b, the fingerprint information of block 1 of the fingerprint representation having been produced by fingerprint modus No. 3 will include the mean value and/or the variance of audio features. The same would apply to the fingerprint information for block 2 of the fingerprint representation having been produced by fingerprint modus No. 3. To convert both items of fingerprint information for block 1 and block 2 of the fingerprint representation in accordance with fingerprint modus No. 3 to fingerprint information of the fingerprint representation having been produced in accordance with fingerprint modus No. 2, as is represented by line 42, the fingerprint information of the fingerprint representation in accordance with fingerprint modus No. 3 must be converted as follows:

$$\text{Mean value: } M_{2n}(F) = 0.5 \cdot [M_n(F) + M'_n(F)]$$

$$\text{Variance: } V_{2n}(F) = 0.5 \cdot [V_n(F) + V'_n(F) + 0.5 \cdot (M_n(F) + M'_n(F))^2]$$

Mean values and variances may be compared with each other if the time-related granularity of a fingerprint representation is an integer multiple of the granularity of the other fingerprint representations. The above equations apply to an exemplary factor of 2. In the equation, the variables $N_n$ and $V_n$ represent the corresponding values of the mean value and/or variance for the fingerprint information of block 1 in accordance with fingerprint modus No. 3, whereas $M_n'$ and $V_n'$ represent the values of the mean value and/or variance for block 2 of the fingerprint representation in accordance with fingerprint modus No. 3 of FIG. 4b. In the event that the variance is used as the fingerprint information, the mean value must also be present, e.g. as further fingerprint information, so as to guarantee scalability.

It shall be pointed out that by analogy herewith the fingerprint information of the fingerprint representation in accordance with fingerprint modus No. 2 may be combined so as to be comparable to the fingerprint information in accordance with fingerprint modus No. 1.

Thus, fingerprint representations of various time-related granularity, i.e. in accordance with different fingerprint modi, may be compared, e.g. by converting the more refined representation into a coarser one.

The inventive fingerprint representation may be defined, for example, as a so-called scalable series, as has been described in paragraph 4.2 of document ISO/IEC JTC 1/SC 29/WG11 (MPEG), Information technology—multimedia content description interface—Part 4: Audio, 27.10.2000.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A method for producing a fingerprint of an audio signal using information defining a plurality of predetermined fingerprint modi, all of the fingerprint modi relating to the same type of fingerprint, the fingerprint modi, however, providing different fingerprints differing from each other with regard to their data volume, on the one hand, and to their characterizing strength for characterizing the audio signal, on the other hand, the fingerprint modi being predetermined such that a fingerprint in accordance with a fingerprint modus having a first characterizing strength is convertible to a fingerprint in accordance with a fingerprint modus having a second characterizing strength, without using the audio signal, the method comprising:

setting a predetermined fingerprint modus of the plurality of predetermined fingerprint modi; and computing a fingerprint in accordance with the set predetermined fingerprint modus.

2. The method as claimed in claim 1, wherein the fingerprint in accordance with a fingerprint modus having higher characterizing strength is convertible to a fingerprint in accordance with a fingerprint modus having lower characterizing strength.

3. The method as claimed in claim 1, further comprising:

transferring or storing the produced fingerprint via a transmission channel having a limited transmission capacity or on a storage medium having a limited storage capacity, respectively, wherein in the step of setting a fingerprint modus, the predetermined fingerprint modus is set depending on the transmission channel or the storage capacity, respectively.

4. The method as claimed in claim 1, wherein the type of fingerprint relates to the tonality properties of the audio signal.

5. The method as claimed in claim 1, wherein the audio signal may be subdivided into a predetermined number of predefined frequency bands, wherein each fingerprint modus includes the production of fingerprint information per predefined frequency band, the fingerprint modi differing with regard to the number of items of fingerprint information, so that a first fingerprint modus includes, as a fingerprint, separately for each frequency band, a first number of items of fingerprint information for a first number of frequency bands, and a second fingerprint modus includes, as a fingerprint, separately for each frequency band, a second number of items of fingerprint information for a second number of frequency bands, the first number differing from the second number, and the predefined frequency bands being the same for all fingerprint modi.

6. The method as claimed in claim 5, wherein the subdivision of the audio signal into the predefined frequency bands comprises, at least partially, logarithmic band partitioning.

7. The method as claimed in claim 5, wherein two frequency bands mutually adjacent in terms of frequency have an overlap area, spectral components in the overlap area belonging to both adjacent frequency bands.

8. The method as claimed in claim 5, wherein the frequency band including the lowest frequency is contained in all fingerprint modi, the fingerprint modi differing in the number of higher frequencies of subsequent frequency bands.

9. The method as claimed in claim 1, wherein the audio signal may be subdivided into blocks successive in time and having a predetermined length, wherein in the production of a fingerprint, fingerprint information per block are determined, the fingerprint modi differing in the number of blocks represented by fingerprint information, and the length of the blocks being the same for all fingerprint modi.

10. The method as claimed in claim 9, wherein a first fingerprint modus includes the mean value and/or the variance of a first predefined number of blocks are included as fingerprint information, and a second fingerprint modus includes the mean value and/or the variance of a second predefined number of blocks, the ratio of the first predefined number to the second predefined number being an integral one.

11. A method of characterizing an audio signal, comprising:

producing a fingerprint of the audio signal using information defining a plurality of predetermined fingerprint modi, all of the fingerprint modi relating to the same type of fingerprint, the fingerprint modi, however, providing different fingerprints differing from each other with regard to their data volume, on the one hand, and to their characterizing strength for characterizing the audio signal, on the other hand, the fingerprint modi being predetermined such that a fingerprint in accordance with a fingerprint modus having a first characterizing strength is convertible to a fingerprint in accordance with a fingerprint modus having a second characterizing strength, without using the audio signal, the method comprising:

setting a predetermined fingerprint modus of the plurality of predetermined fingerprint modi; and computing a fingerprint in accordance with the set predetermined fingerprint modus;

comparing the computed fingerprint with a plurality of stored fingerprints representing known audio signals to characterize the audio signal, the stored fingerprints having been produced in accordance with one of the plurality of fingerprint modi, the step of comparing comprising:

examining whether the search fingerprint and the database fingerprint have been produced in accordance with different fingerprint modi;

converting the search fingerprint and/or the database fingerprint so that the fingerprints to be compared exist in accordance with the same fingerprint modus; and performing the comparison using the fingerprints existing in the same fingerprint modus.

12. The method as claimed in claim 11, wherein each fingerprint modus includes the production of fingerprint information per predefined frequency band, the fingerprint modi differing with regard to the number of items of fingerprint information, so that a first fingerprint modus includes, as a fingerprint, separately for each frequency band, a first number of items of fingerprint information for a first number of frequency bands, and a second fingerprint modus includes, as a fingerprint, separately for each frequency band, a second number of items of fingerprint information for a second number of frequency bands, the first number differing from the second number, wherein the step of converting comprises suppressing fingerprint information for sub-bands.

13. The method as claimed in claim 11, wherein the audio signal may be subdivided into blocks successive in time and having a predetermined length, wherein in the production of a fingerprint, fingerprint information per block are determined, the fingerprint modi differing in the number of blocks represented by fingerprint information, and the length of the blocks being the same for all fingerprint modi, and wherein the step of converting comprises the step of combining the fingerprint information of blocks successive in time.

14. The method as claimed in claim 13, wherein the fingerprint information includes a mean value and/or a variance, and wherein an integer ratio exists between the blocks combined in the search fingerprint and the blocks combined in the database fingerprint.

15. A fingerprint representation for an audio signal, with a fingerprint, the fingerprint being configured in accordance with one of a plurality of predetermined fingerprint modi, all of the fingerprint modi relating to the same type of fingerprint, the fingerprint modi, however, providing different fingerprints differing from each other with regard to their data volume, on the one hand, and to their characterizing strength for characterizing the audio signal, on the other hand, the fingerprint modi being predetermined such that a fingerprint in accordance with a fingerprint modus having a first characterizing strength is convertible to a fingerprint in accordance with a fingerprint modus having a second characterizing strength, without using the audio signal.

16. The fingerprint representation as claimed in claim 15, further comprising an indicator indicating the fingerprint modus underlying the fingerprint.

17. An apparatus for producing a fingerprint of an audio signal using information defining a plurality of pre-determined fingerprint modi, all of the fingerprint modi relating to the same type of fingerprint, the fingerprint modi, however, providing different fingerprints differing from each other with regard to their data volume, on the one hand, and to their characterizing strength for characterizing the audio signal, on the other hand, the fingerprint modi being predetermined such that a fingerprint in accordance with a fingerprint modus having a first characterizing strength is convertible to a fingerprint in accordance with a fingerprint modus having a second characterizing strength, without using the audio signal, the apparatus comprising:

means for setting a predetermined fingerprint modus of the plurality of predetermined fingerprint modi; and means for computing a fingerprint in accordance with the set predetermined fingerprint modus.

18. An apparatus for characterizing an audio signal, comprising:

means for producing a search fingerprint of the audio signal using information defining a plurality of pre-determined fingerprint modi, all of the fingerprint modi relating to the same type of fingerprint, the fingerprint modi, however, providing different fingerprints differing from each other with regard to their data volume, on the one hand, and to their characterizing strength for characterizing the audio signal, on the other hand, the fingerprint modi being predetermined such that a fingerprint in accordance with a fingerprint modus having a first characterizing strength is convertible to a fingerprint in accordance with a fingerprint modus having a second characterizing strength, without using the audio signal, the means comprising:

means for setting a predetermined fingerprint modus of the plurality of predetermined fingerprint modi; and means for computing a fingerprint in accordance with the set predetermined fingerprint modus;

means for comparing the computed fingerprint with a plurality of stored fingerprints representing known audio signals to characterize the audio signal, the stored fingerprints having been produced in accordance with one of the plurality of fingerprint modi, the means comprising:

means for examining whether the search fingerprint and the database fingerprint have been produced in accordance with different fingerprint modi;

means for converting the search fingerprint and/or the database fingerprint so that the fingerprints to be compared exist in accordance with the same fingerprint modus; and means for performing the comparison using the fingerprints existing in the same fingerprint modus.

* * * * *